May 22, 1962 H. ALLEN 3,035,452
PLUG VALVE OPERATOR OR THE LIKE
Filed Feb. 15, 1960 2 Sheets-Sheet 1

Herbert Allen
INVENTOR.

BY Browning, Simms, Hyer
& Eickenroht
ATTORNEYS

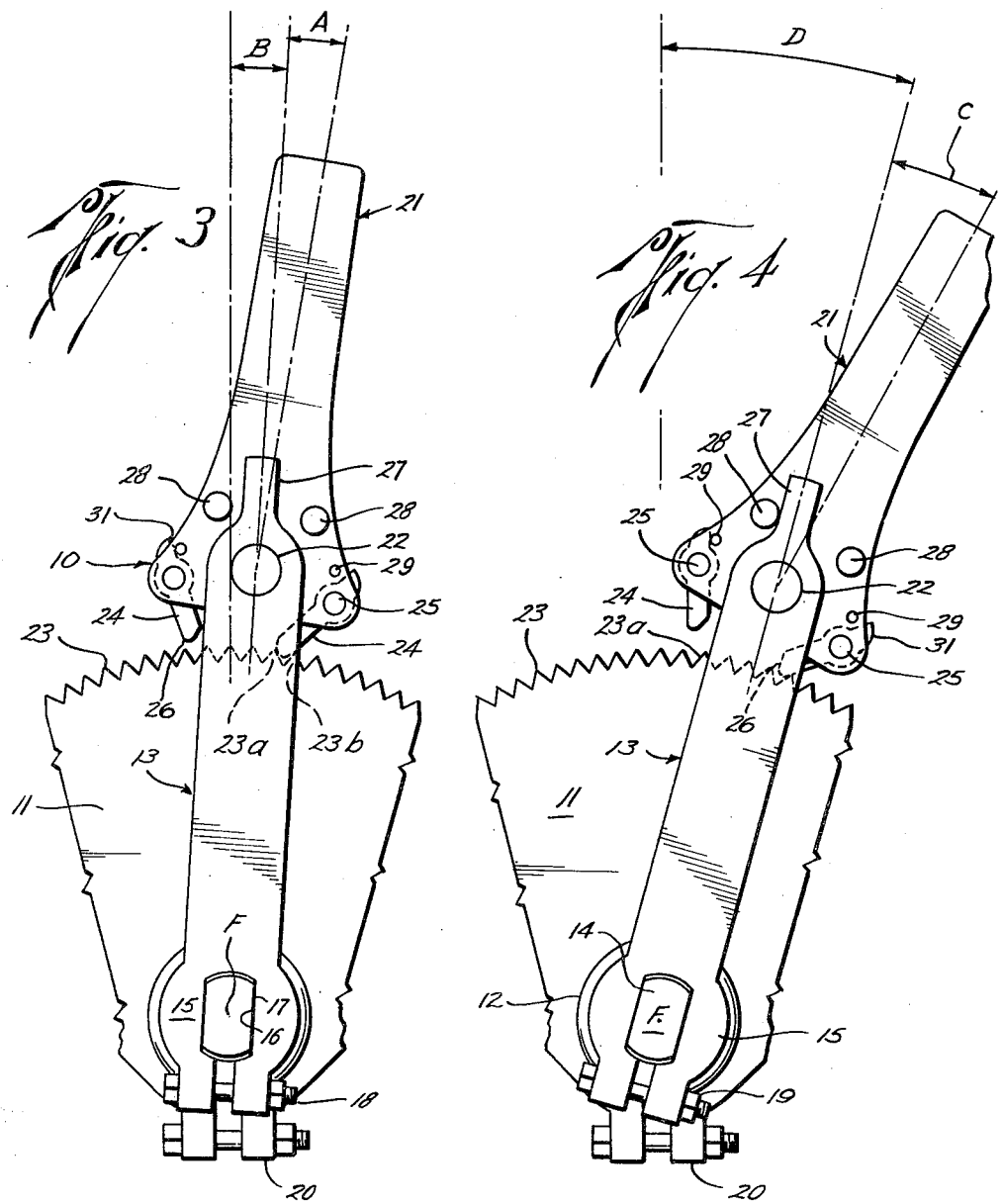

United States Patent Office 3,035,452
Patented May 22, 1962

3,035,452
PLUG VALVE OPERATOR OR THE LIKE
Herbert Allen, Houston, Tex., assignor to Cameron Iron Works, Inc., Houston, Tex., a corporation of Texas
Filed Feb. 15, 1960, Ser. No. 8,632
8 Claims. (Cl. 74—157)

This invention relates to improved apparatus for rotating a first part about a fixed axis with respect to a second part, and finds particular utility as an operator for opening and closing a plug valve.

In a valve of this type, the torque required to rotate the valve member between opened and closed positions will vary from a high value when the valve member is at the end of its closing movement or start of its opening movement, and there are large frictional forces to be overcome due to the large pressure drop across it, to a low value when the valve member moves to a position in which there is substantially a full opening through the valve. Conventional operators for plug valves usually employ gearing to develop the maximum torque required in opening and closing the valve member. However, after the initial opening and before the final closing movement, this gearing serves no useful purpose and merely adds to the work of operating the valve.

An object of this invention is to provide a novel operator for a plug valve, or similar device having a rotating part with varying torque requirements, which is adapted to apply high torque only when needed; and, more particularly, which is adapted to apply a relatively low torque when the resistance to rotation of the rotating part is low, and then apply a higher torque when the resistance increases to a point where the application of low torque is no longer capable of rotating such part.

Another object is to provide an operator of this type which is adapted to rotate the rotating part merely upon the turning or swinging of a handle continuously in one direction as long as such part turns easily, and then continue its rotation when turning is no longer possible upon a simple reciprocation of the handle.

Still another object is to provide an operator of the type described in either of the foregoing objects in which the rotating part may be selectively rotated in either direction, as in the opening and closing of a plug valve, merely upon turning or swinging the handle in an opposite direction.

A further object is to provide an operator of this type which is readily mountable on and removable from the rotating part as well as the other part with respect to which the rotating part is rotatable, such as the valve member and body, respectively, of a plug valve.

Other objects, advantages and features of this invention will be apparent to one skilled in the art upon a consideration of the written specification, the attached claims and the annexed drawings.

In the drawings, wherein like reference characters are used throughout to designate like parts:

FIG. 3 is a view of the operator similar to FIG. 2, but wherein the handle has been swung to rotate the valve member through a small angle in a clockwise direction; and FIG. 4 is another view similar to FIGS. 2 and 3, but in which the handle has been swung further to continue rotation of the valve member in a clockwise direction when the resistance to such rotation is small.

Figure 1:
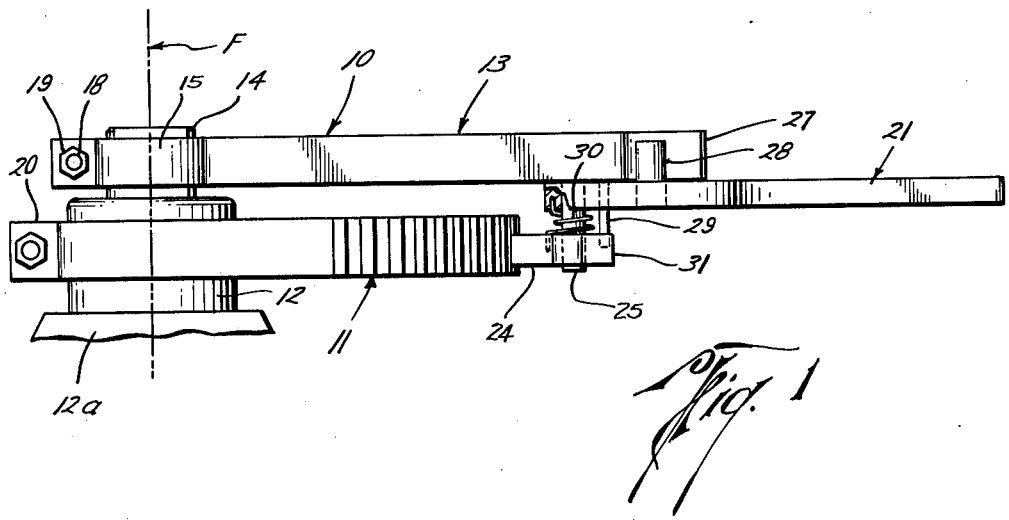
FIG. 1 is a side elevational view of an operator constructed in accordance with the present invention and removably connected to a plug valve for rotating the valve member thereof between opened and closed positions.

With reference to the above-described drawings, the illustrated embodiment of the operator of this invention, which is indicated in its entirety by reference character 10, comprises a member in the form of a plate 11 connected to the bonnet 12 of a plug valve body 12a, and an arm 13 connected to the stem 14 of a valve member (not shown) rotatable within the valve body 12a for opening and closing the valve. More particularly, and as well known in the art, the stem 14 is journaled within the bonnet 12 for rotation about a fixed vertical axis F, the extent of rotation depending upon the angle required to move the valve member between opened and closed positions. Ordinarily, this angle is 90°, although the operator 10 is capable of rotating the valve member through a larger or smaller angle without departing from the novel concepts of the invention.

Figure 2:
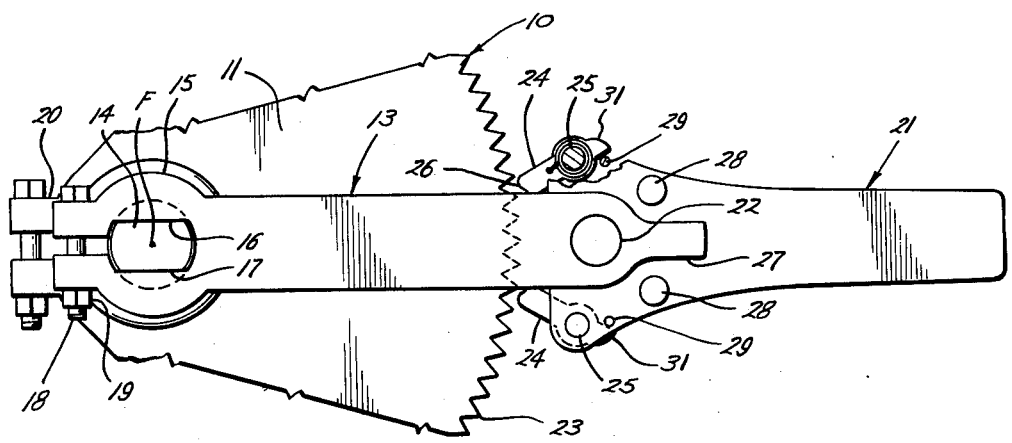
FIG. 2 is a plan view of the operator of FIG. 1 with the handle thereof in a neutral or inoperative position.

As best shown in FIGS. 2 to 4, the arm 13 is releasably connected to the stem 14 of the valve member for rotation therewith, and the plate 11 is releasably connected to the bonnet 12 of the valve body so that it is held against rotation with the stem and arm. More particularly, the arm 13 has a slotted clamp 15 at its inner end with flat sides 16 adapted to slide over similarly flattened sides 17 on the valve stem 14. The bolt 18 and nut 19 enable the clamp to be tightened or loosened, as desired, in connecting and disconnecting the arm with respect to the stem. The plate 11 is releasably connected to the bonnet 12 by a clamp 20 of similar structure, so that the arm and plate may be placed over the stem and bonnet as well as removed therefrom as a unit. On the other hand, it is obvious that the arm and plate may be fixed or integrally secured to these parts of the plug valve, or corresponding parts of similar devices in which a first part, such as the stem 14, is to be rotated about a fixed axis F with respect to a second part, such as the valve body bonnet 12.

A handle 21 is pivotally connected by a pin 22 to the outer free end of the arm 13 for swinging in opposite directions with respect to the arm as a turning force is applied to the outer end of the handle. More particularly, the handle preferably extends in a direction away from the axis of rotation F of the arm 13, and, in the neutral position shown in FIG. 2, extends in substantial alignment with the arm.

The plate 11 has teeth 23 arranged concentrically about the axis of rotation F of the stem and arm 13 and facing away from the axis and toward the handle 21. A dog 24 is pivotally mounted on the handle by means of a pin 25 on each side of the outer end of the arm 13. More particularly, each dog has an inner end 26 which, in the neutral position of the handle shown in FIG. 2, is urged toward the teeth 23 for disposal just outwardly of the peaks of the teeth 23.

However, as shown in FIG. 3, when the handle 21 is swung through an angle A in a clockwise direction with respect to the arm 13, the inner end of the dog 24 on the clockwise side of the arm is moved into engagement with one side of a tooth 23a, while the inner end of the dog on the opposite side of the arm is swung further away from the teeth. More particularly, the engaging dog 24 forms a force-transmitting connection between its pivotal connection 25 to the handle 21 and the plate 11 so that, as the handle continues to be turned in a clockwise direction, the arm 13 is rotated in the same direction, approximately through the angle B shown in FIG. 3.

During this initial rotation of the arm 13, the engaging dog is also swung in a clockwise direction about the pin 25 so as to maintain the connection between the handle and plate. Upon further turning of the handle and additional rotation of the arm past the position shown in FIG. 3, however, the engaging dog will be swung further until such time that its inner end 26 moves out of engagement with the side of the tooth 23a to thereby break the force-transmitting connection between the pin 25 and the plate.

The outer end of the arm 13 is provided with a finger 27 which projects radially away from its axis of rotation F and between upstanding pins 28 on the handle. As the handle 21 is swung further with respect to the arm and through the angle C shown in FIG. 4, the pin 28 on the counterclockwise side of the finger 27 will move into engagement therewith. Assuming that there is relatively little resistance to further turning of the valve member in a clockwise direction, continued turning of the handle in force-transmitting connection with the arm 13 will further rotate the arm in a clockwise direction through the angle D shown in FIG. 4. During this continued rotation of the arm, the inner end 26 of the dog 24 on the clockwise side of the arm rides freely over the teeth which succeed or follow the tooth 23a in a clockwise direction along the plate 11, and the inner end 26 of the other dog remains above the teeth, as can be seen from FIG. 4.

As indicated above, this latter rotation of the arm will continue only so long as the resistance to rotation of the valve member is not too great. In the event that the resistance to turning of the valve member cannot be overcome by the torque so applied, the handle is turned back in a counterclockwise direction to at least approximately its neutral position in alignment with the arm 13 and then reciprocated in relatively short strokes to apply a large torque. Thus, when the handle is so aligned, the inner end 26 of the clockwise dog will be disposed in a position for engaging the side of a succeeding tooth 23b, and then of further succeeding teeth, upon repeated swinging of the handle in a clockwise direction. In this manner, the arm and valve member may be rotated in step-by-step fashion until such time that the resistance to rotation of the valve member is low enough that the torque applied to the outer end of the handle and transmitted to the arm through the pin 28 is sufficient to continue rotation of the arm and valve member.

In this respect, it will be appreciated that the force transmitted by the dog 24 between the tooth and the pin 25 on the handle is a multiple of the force applied to the outer end of the handle, dependent at least approximately on the proportion of the distance from the end of the handle and the teeth to the distance from the teeth to the pin 25. Obviously, these distances may be varied to provide a desired multiplication of torque upon step-by-step rotation of the arm 13 in response to reciprocation of the handle.

As shown in the illustrated embodiment of the invention, and as previously described, there are a pair of dogs 24 and pins 28 so that the handle 21 may be swung in either direction about the pin 22 for rotating the arm 13 and valve member in either direction about the fixed axis F. Thus, if it were desired to rotate the valve member in a counterclockwise direction, as seen in FIGS. 2 and 4, the handle would be turned or swung in a counterclockwise direction from the position shown in FIG. 2. The arm could thereby be rotated in a manner corresponding to that previously described in connection with its clockwise direction.

A pin 29 depending from the handle 21 on each side of the arm 13 provides a stop for locating each dog on the same side of the arm with its inner end disposed to engage a tooth on the plate 11 upon turning of the handle. More particularly, and as shown in FIG. 2, the pins 29 engage the outer ends 31 of the dogs to locate them, at least in the neutral position of the handle, with their inner ends directed angularly toward one another and the axis of rotation of the stem 14. This location of the pins also prevents the inner end of the dog away from the direction in which the handle is swung from engaging the teeth, as shown in FIGS. 3 and 4. Still further, it enables the dog toward which the handle is swung to ride freely over the teeth as it disengages from the tooth with which it forms a force-transmitting connection.

A coil spring 30 is anchored at opposite ends thereof to each dog and to the handle 21, as best shown in FIG. 1, for yieldably urging the outer end 31 of each dog into engagement with the pin 29. This, of course, will maintain the dogs in engagement with the pins 29 when the handle is in its neutral position, as shown in FIG. 2. Thus, the handle can be swung in either direction from its neutral position to rotate the arm as desired. Obviously, therefore, when the handle is returned to its neutral position from a position in which it has been swung out of alignment with the arm 13, the spring 30 will swing one dog back into engagement with the pin 29. For example, when the handle is turned in a clockwise direction so as to also swing the dog 24 in a clockwise direction, as shown in FIG. 3, the spring 30 is effective, upon return of the handle in a counterclockwise direction to its neutral position, to swing the dog in a counterclockwise direction so that its inner end 26 is moved to a new position with respect to the plate for engaging a succeeding tooth upon repeated swinging of the handle in the clockwise direction. On the other hand, the spring yields to permit this clockwise direction of the dog, as shown in FIG. 3, as well as the riding of the dog over the peaks and valleys of the teeth, as shown in FIG. 4.

The arc over which the teeth on the plate extend is dependent, of course, upon the limits of movement of the valve member in opening and closing the valve. Therefore, ordinarily, the arm and handle of the operator would be disposed toward one end of the row of teeth in the closed position of the valve member and toward the other end thereof in the open position of the valve member.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for rotating a first part about a fixed axis with respect to a second part, comprising an arm connectable to the first part for rotation about said axis, a toothed member for connection to the second part with its teeth arranged concentrically of said axis, a handle pivotally connected to the arm, a dog pivotally mounted on the handle for engaging a tooth on the member as the handle is swung in one direction about its pivotal connection with said arm and then rotating the arm upon further swinging of the handle in the one direction, means yieldably urging said dog into a position to engage a succeeding tooth on the member upon swinging of the handle in an opposite direction after the arm has been rotated, and a part on the handle engageable with a part on the arm to continue rotation of the arm upon still further swinging of the handle.

2. Apparatus for rotating a first part about a fixed axis with respect to a second part, comprising an arm rotatable with the first part about said axis, a toothed member adapted to be connected to the second part with its teeth arranged concentrically of said axis, a handle pivotally connected to the arm, a dog pivotally mounted on the handle, means locating the dog for engagement with a tooth on the member as the handle is swung in one direction about its pivotal connection with said arm to form a force-transmitting connection between the handle and member for rotating the arm about said axis upon further swinging of the handle in the one direction, means yieldably urging said dog into engagement with the locating means, upon swinging of the handle in an opposite direction with respect to the arm from the position it occupies when further swung in said one direction, so that it will engage a succeeding tooth on the member to further rotate the arm upon a repeated swinging of the handle in said one direction, and a part on the handle engageable with a part on the arm to continue rotation of the arm upon swinging of the handle beyond the position in which the dog forms a force-transmitting connection between the handle and member.

3. Apparatus for rotating a first part about a fixed axis with respect to a second part, comprising an arm adapted to be connected to the first part for rotation therewith, a member having teeth thereon and adapted to be connected to the second part with its teeth arranged concentrically of and facing away from said axis, a handle pivotally connected to the arm radially outwardly of the teeth for swinging thereabout, a dog pivotally mounted on the handle, a stop engaging the dog to locate it in a position to engage a tooth on the member, as the handle is swung in one direction from a position substantially aligned with and extending outwardly from the arm, so that the dog thereby forms a force-transmitting connection between the handle and member for rotating the arm about said axis upon further swinging of the handle in said one direction, said dog being swingable out of engagement with the stop, when the handle is swung still further in said one direction, and then back into engagement with the stop, upon swinging of the handle back in an opposite direction to at least approximately its position substantially aligned with and extending outwardly from the arm, for engaging a succeeding tooth on the member to further rotate the arm upon a repeated swinging of the handle in said one direction, and a part on the handle engageable with a part on the arm to continue rotation of the arm so long as the resistance to rotation of the arm is not too great.

4. A plug valve operator, comprising a toothed member for connection to a valve body, an arm for connection to a valve stem, a handle pivotally connected to the arm, a dog on the handle for engaging a tooth on the member to rotate the arm upon swinging of the handle from a neutral position in one direction about its pivotal connection with the arm and then engaging a succeeding tooth upon swinging of the handle to and from its neutral position to further rotate the arm, and a part on the handle engageable with a part on the arm to continue rotation of said arm upon further swinging of the handle in said one direction.

5. A plug valve operator of the character defined in claim 4, wherein each of said member and arm is provided with means for releasably connecting them to a valve body and valve stem, respectively.

6. A plug valve operator, comprising a member having teeth thereon and adapted to be connected to a valve body with its teeth arranged in an arc concentrically of the axis of rotation of a valve stem, an arm connectable to the valve stem for rotation therewith, a handle pivotally connected to the arm, a dog pivotally mounted on the handle for engaging a tooth on the member to provide a fulcrum for the handle for rotating the arm about said axis upon swinging of the handle in one direction about its pivotal connection to the arm and then engaging a succeeding tooth to further rotatae the arm upon return of the handle to at least approximately its original position and subsequent swinging of said handle in said one direction, and a part on the handle engageable with a part on the arm to continue rotation of said arm upon further swinging of the handle in the one direction.

7. A plug valve operator of the character defined in claim 6, wherein the handle is at least substantially aligned with and its free end extends away from the arm in said original position.

8. A plug valve operator, comprising an arm connectable to a valve stem for rotation about its axis of rotation, a toothed member for connection to the valve body with its teeth arranged concentrically of the axis of rotation of the valve stem, a handle pivotally connected to the arm, a pair of dogs pivotally mounted on the handle, one dog contacting a tooth on the member so that the arm is forced in one rotative direction upon swinging of the handle in one direction about its pivotal connection with said arm and the other dog contacting a tooth on the member so that the arm is forced in the other direction upon swinging of said handle in the other direction about said pivotal connection, each dog contacting a tooth so that the arm is further rotated when the handle is returned to at least approximately its original position and then swung in one or the other direction, a first part on the handle engageable with a first part on the arm upon further swinging in the one direction to continue rotation of the arm in said one direction, and a second part on the handle engageable with a second part on the arm upon further swinging in the other direction to continue rotation of the arm in said other direction.

References Cited in the file of this patent
UNITED STATES PATENTS
1,182,707   Quade _____ May 9, 1916
FOREIGN PATENTS
27,582   Great Britain _____ Nov. 28, 1910